United States Patent [19]

Richter et al.

[11] 4,138,922

[45] Feb. 13, 1979

[54] SAFETY DISK ASSEMBLY

[75] Inventors: Martin Richter, Freising; Albert Busler, Puchheim, both of Fed. Rep. of Germany

[73] Assignee: Hilti Aktiengesellschaft, Schaan, Liechtenstein

[21] Appl. No.: 817,503

[22] Filed: Jul. 20, 1977
(Under 37 CFR 1.47)

[30] Foreign Application Priority Data

Jul. 20, 1976 [DE] Fed. Rep. of Germany ....... 2632605
Dec. 15, 1976 [DE] Fed. Rep. of Germany ....... 2656832

[51] Int. Cl.$^2$ ............................................. F16B 31/02
[52] U.S. Cl. ........................................................ 85/62
[58] Field of Search ........................... 85/62, 61, 50 R; 116/DIG. 34, 114 AC; 73/88 F

[56] References Cited

U.S. PATENT DOCUMENTS

| | | | |
|---|---|---|---|
| 1,083,471 | 1/1914 | Walton et al. | 151/38 |
| 2,394,812 | 2/1946 | Seitz | 85/62 X |
| 3,021,747 | 2/1962 | Garrett | 85/62 |
| 3,153,974 | 10/1964 | Canning | 85/62 |
| 3,187,621 | 6/1965 | Turner | 85/62 |
| 3,191,486 | 6/1965 | Gibbens | 85/61 |
| 3,329,058 | 7/1967 | Cumming | 85/62 |
| 3,913,649 | 10/1975 | Stanaitis | 151/38 |
| 3,948,141 | 4/1976 | Shinjo | 85/62 |
| 4,067,184 | 1/1978 | Johnson | 85/50 R X |

FOREIGN PATENT DOCUMENTS 2352810 4/1975 Fed. Rep. of Germany.

Primary Examiner—Rodney H. Bonck
Attorney, Agent, or Firm—Toren, McGeady and Stanger

[57] ABSTRACT

A safety disk assembly is used in determining when a predetermined force is exerted in tightening a nut, bolt or similar fastening member to a base structure. The safety disk assembly is positioned between a fastening part, such as a nut, and the surface of the base structure. The safety disk assembly includes a first disk and a second disk with a shear pin interconnecting them. Additional shear elements can be used in the assembly. Preferably, a thin layer of Teflon is positioned between the disks. When a torque is applied to the fastening member, the shear pin breaks when a predetermined break point is reached. The friction coefficients of the disk surfaces and the effective radii of the disks are selected to provide the predetermined break point characteristics. When the shear pin breaks one of the disks can move relative to the other. An indicator is incorporated into the safety disk assembly to show when the predetermined break point has been exceeded.

18 Claims, 6 Drawing Figures

SAFETY DISK ASSEMBLY

SUMMARY OF THE INVENTION

The present invention is directed to a safety disk assembly for use with a fastening member to be tightened against a base structure. The fastening member includes a fastening part, such as a bolt head or a nut, which presses the safety disk assembly against the surface of the base structure during the tightening operation.

When tightening a fastening part such as a bolt or nut, particularly in expansion dowels, the fastening part should be tightened against the base structure axially frequently only with a certain force, but in addition, with at least that force.

Under certain defined conditions, where there is a clear relation between the torque with which the fastening member is tightened and the force with which it acts axially against the base structure, torque wrenches are used so that the fastening member can be tightened until a certain torque is achieved which corresponds to a certain tightening force. It is desirable, however, to do without such a relatively expensive tool which can be easily damaged, for instance, when used on a construction site. In practice it frequently happens that the proper tightening of the fastening member is either overlooked or deliberately neglected and later the torque cannot be checked in a simple manner. A torque wrench must fail, however, from the outset in determining the tightening force where there is no clear relation between torque and the tightening force.

To recognize when a minimum tightening force is attained, destructible or axially compressibles have been suggested. Moreover, it has been suggested to make the head or nut of the fastening member destructible.

Where the nut or head is made destructible sharp edges or burrs are formed which represent a clear hazard. Further, the fractured surfaces are no longer corrosion protected and the connection can be destroyed in the course of time.

Therefore, the primary object of the present invention is to provide a simple and safe control device which indicates when the tightening force exerted by the fastening part of a fastening member against the base structure, and thus the extraction strength of the fastening member, has reached or exceeded a certain value.

In accordance with the present invention, a safety disk assembly consists of two ring-shaped disks bearing against one another and arranged between the fastening part and the surface of the base structure in the manner of washers. The disks are interconnected by a shear member having a predetermined break point so that the disks cannot be rotated relative to one another. The shear member may either be a form locking member or a material locking member. The first one of the disks is positioned between the fastening part and the second disk while the second disk is positioned between the first disk and the surface of the base structure. The friction moments between the fastening part, the first disk, the second disk and the surface of the base structure are selected by proportioning the friction coefficients and the effective friction radii so that, when a predetermined tightening force is exerted by the fastening part of the safety disk assembly, the predetermined break point is exceeded by a torque between the two disks and the disks then rotate relative to one another. Further, an indicator is incorporated into the safety disk assembly to provide a visible showing of the relative rotation of the disks.

Consequently, the two ring-shaped disks are positioned between the fastening part and the surface of the base structure and it is important that they transmit the entire force exerted by the fastening part in the axial direction against the base structure.

Preferably, the disks are formed of metal, such as galvanized steel, or any other suitable material. The force existing between the individual parts of the safety disk assembly offer resistance when an attempt is made to rotate the parts relative to one another. The resistance is caused by friction, accordingly, the friction is equal up to a certain maximum value to the exerted torque which it resists.

The resistance is a quantity of the torque type. The maximum value of the resistance is called the friction moment $M_H$ in the case of static friction and $M_G$ in the case of sliding friction. The friction moments are defined in analogy to the friction forces.

If friction forces are the product of the forces K with the two parts or disks disposed in side-by-side contact with one another, by friction coefficient $\mu_H$ (in the case of static friction) and $\mu_G$ (in the case of sliding friction), then the friction moments are the products of the forces K, in this case the tightening force, the friction moments $\mu_H$ and $\mu_G$, respectively, and the radii R, on which these forces act.

If several or even an infinite number of radii must be taken into consideration in a case, that is, if it is necessary to integrate over the radii and the forces acting on them, the result can be expressed by using an "effective friction radius R" which will be used here for simplicity's sake and which will is to be understood in that sense. Accordingly:

$$M_H = K \cdot \mu_H \cdot R$$

$$M_G = K \cdot \mu_G \cdot R$$

In regard to the sliding friction moment $M_H$, it must be kept in mind, as mentioned above, that this definition concerns the maximum value of the torque (naturally with fixed K), which can be offered to an external torque. The "static friction" is defined as the maximum value which, when exceeded, effects the breaking of the interconnection.

If the external moments are lower than this maximum value, a resistance is provided which prevents movement, that is, prevents any rotation. This resistance is called "acting friction moment" in contrast to the (maximum) (static) friction moment. Generally, its maximum is the friction moment. Sliding friction moments are in this sense naturally always maximum (likewise with fixed K).

Hereafter, when it is stated that the "friction moment" between two parts is greater than the "friction moment" between two other parts, this means that both the static and sliding friction moment between the first mentioned parts is greater than both the static and sliding friction moment between the other parts.

In general, by the "moment" $M_{ST}$, which is exerted by a preset breaking point member, is meant again the resistance to a maximum torque which prevents a relative rotation of the parts interconnected by the predetermined break point member. Naturally, if the external torques are lower than that of the maximum moment $M_{ST}$, the predetermined break point member will exert a smaller moment which is equal and in the opposite direction. Accordingly, this is referred to as the "acting torque" of the predetermined break point member.

If a (static) friction moment is exceeded by the external torque, the interconnected parts begin to rotate relative to one another. These parts will rotate relative to one another for which the product $\mu_H R$ is smallest, since K is equal for all, as assumed. This can be taken into account by suitably proportioning $\mu \cdot R$ which will be discussed below on the basis of the diagram in the drawings.

In the present arrangement, a moment $M_{ST}$ with a constant maximum value, hence not variable by K, is added to the friction moment between the ring-shaped disks. This is effected by interconnecting the disks with the predetermined break point member. B, the (breaking) force, is required to destroy the predetermined break point member. The torque required for such destruction is $BxR_{ST}$, where $R_{ST}$ is the distance of the preset breaking point member from the axis of rotation. $BxR_{ST}$ is the (maximum) moment which the predetermined break point member can resist in preventing relative rotation of the disks, hence $BxR_{ST} = M_{ST}$.

By suitably proportioning the friction values $\mu$ and the effective radii R as well as the breaking force B and the radius $R_{ST}$, it is possible to obtain a predeterminable tightening force where the force exerted by a torque on the predetermined break point member is equal to the breaking force and thus is sufficient to fracture the predetermined break point member. With a corresponding selection of the friction values and of the effective friction radii, the ring-shaped disks will rotate relative to one another and such rotation can be visibly indicated in some way, for example, by providing colored markings or by shaping the disks for exhibiting the change of position which indicates that rotation of the disks has occurred.

A safety disk assembly can be provided which is simple and easy to manufacture and use and which can indicate when a certain predetermined force has been attained or exceeded without requiring much in the way of space and without requiring any special tools for its application. Furthermore, the assembly does not interfere with the tightening of the fastening member against the base structure. Moreover, the safety disk assembly can also serve as an ordinary washer when the tightening operation is completed, accordingly, it is not in the way after it has performed its function.

The requirement for a suitable indication of the safety disk assembly by suitable selection of the friction coefficient and friction radii are advantageously afforded in that, when the fastening part is tightened against the safety assembly, the friction moment $M_2$ between the two ring disks is lower than the friction moment $M_1$ between the fastening parts and one of the disks, and the friction moment $M_3$ between the other disk and the surface of the base structure. Furthermore, the predetermined break point member is designed so that, when the fastening part is tightened at a predetermined tightening force, the differential friction moment between the smaller of the friction moments $M_1$ and $M_3$ and the friction moment $M_2$ is sufficient to break the predetermined break point member.

This characteristic is described more fully as follows based on the diagram set forth in FIG. 1. It is assumed, without limiting the general applicability of the consideration, that the friction moment $M_1$, that is; the friction moment between the fastening part and the adjacent ring disk, is lower than the friction moment $M_3$, that is the friction moment between the other ring disk and the base structure surface. This is not necessary in all cases. It is advisable, however, where the quality of the base structure is not known from the outset and, as a result, there are no definite conditions for $M_3$.

In the diagram of FIG. 1, the friction moments have been plotted at random against the tightening force K, while maintaining the above-mentioned conditions. This was done by continuous lines identified along the side of the diagram. Along the moment axis, the constant moment $M_{ST}$ (that is K — independent) has been set forth. The dashed line represents the sum of $M_{2,H}$ and $M_{ST}$, hence the maximum acting moment between the disks until the predetermined break point member ruptures.

When an external torque is applied, that is by tightening the fastening part on the fastening member toward the base structure, one part of the overall arrangement will rotate relative to another part. This rotation will take place when the static friction moment is exceeded first by the external torque. Normally, curve $M_{2,H}$ will apply here. However, the ring-shaped disk cannot rotate relative to one another because the predetermined break point member interconnects them. Accordingly, the fastening part begins to rotate relative to the adjacent disk since the friction moment between the fastening part and the adjacent disk, $M_1$, is assumed smaller than the friction moment $M_3$ between the other disk and the surface of the base structure. A determining factor in such movement is the sliding friction $M_{1,G}$, because only so much external movement is required and is applied as necessary to commence or continue the movement. As the fastening part is rotated, the force which the fastening part exerts against the base structure and thus against the safety disk assembly is normally increased at the same time. The sliding friction moment $M_{1,G}$ will increase proportionately to K, like the other friction moments, and a correspondingly greater external moment will be necessary to maintain rotation.

It should be noted that the rotation and the increase of the force K need not be interrelated. The safety disk assembly can also be used where K is produced in another way. The rotation is necessary for possible release of the safety disk assembly.

The course of the external torque is represented by the dotted line. If the operator applying the external torque stops during the process, at the forces $K_1$, $K_2$, $K_3$, the movement is stopped. The external torque moves to the static friction line $M_{1,H}$ and drops again to $M_{1,G}$ when the movement is restarted. These two cases have to be distinguished. Initially, we assume that the rotation of the fastening part is no longer stopped after the vertical extending upwardly from the point $K_4$ to the intersection of the lines $M_{2,H} + M_{ST}$ with the line $M_{1,H}$, accordingly, the external torque moves along the line $M_{1,G}$. At the intersection of this line with the dashed line $M_{2,H} + M_{ST}$, the predetermined break point member breaks, because the intersection indicates that the sliding friction moment $M_{1,G}$ acting between the fastening part and the adjacent ring disk and, accordingly, also between the two disks, has become greater than the moment $M_{2,H} + M_{ST}$ which combines the friction between the two ring-shaped disks with the moment which the break point member can exert. When the member fractures, the external moment will drop to the static or sliding friction line $M_2$, depending on whether movement is stopped or not. This point on the diagram is located in vertical alignment above the point $K_6$.

It is now assumed that rotation is again stopped at the location above the point $K_5$. When movement is recommenced, line $M_{1,H}$ for the torque acts before a new movement occurs. This line, however, has already intersected the line $M_{2,H} + M_{ST}$. When movement is restarted, the predetermined break point member should break at $K_5$.

The external torque thus drops at $K_5$ to the static or sliding friction moment $M_2$. These operations are represented by the vertical line formed of x.x.. The dotted extension running to the right indicates, as above $K_6$, that the fastening part can continue to rotate until intercepted by a stop.

From the diagram certain conclusions on the expedient design of the safety disk assembly can be drawn.

The spacing between $K_4$ and $K_6$ will be smaller when the sliding and static friction coefficients $\mu_{1,H}$ and $\mu_{1,G}$ are closer together. The accuracy of the tightening force K at which the rotation of the disks in the safety disk assembly is effected will be greater with practically unavoidable differences of $M_{ST}$ in the manufacture as the angle alpha is greater, that is the angle between the lines of friction moments $M_2$ and $M_1$. This can be achieved in one instance by making $M_2$ as small as possible.

The size of the other friction moments is not important, as long as they are not greater than the moments under consideration (for example, where $M_3$ is greater than $M_1$ and $M_2$). Therefore, it follows that additional elements, that is additional disks, can be included in the assembly to afford a better distribution of the force or defined values for the friction moments, provided that the foregoing additions are satisfied. By a corresponding design of the elements or of their friction coefficients and the effective friction radii, the function of the smaller of the friction moments $M_1$ and $M_3$ can be taken over.

With a given $M_1$ (at $M_1 < M_3$ or with a given $M_3$ at $M_3 < M_1$) and $M_2$, it can be simply indicated from the diagram how the predetermined break point member must be designed to break at a predetermined K, its moment $M_{ST}$ must be just equal to the difference of $M_1$ (or $M_3$) and $M_2$ at this K.

In a preferred embodiment, the conditions for the friction moments are better satisfied if a thin layer having a low friction value, such as Teflon, is arranged between the two disks in the assembly.

Due to the fact that $\mu_2$ is kept particularly low, $M_1$ can be varied over a wide range, depending on the requirements of the scope of application of the safety disk assembly, $M_2$ can be compeletly neglected under certain circumstances with regard to the other quantities, so that simpler mathematical relations exist between these other quantities.

In place of a layer of Teflon, conventional lubricants can be used between the disks.

In another advantageous embodiment of the invention, the predetermined break point member interconnecting the two ring-shaped disks is formed by a member in form locking engagement with the disks, that is, by at least one shear element. The product of the shearing force and its radius forms the moment $M_{ST}$ which defines the resistance to rotation of the ring-shaped disks provided by the shearing element. A special advantage in the use of shearing elements is that the force B, required to effect shearing, can be easily determined. The radius $R_{ST}$ can also be obtained with great accuracy without much effort. The accuracy of these factors also makes the moment $M_{ST}$ accurate and contributes to the accuracy of the tightening force K at which the predetermined break point ruptures.

Another advantageous feature is that the shearing element can be provided as a shearing pin. With such a member there is the advantage that a more suitable material can be utilized, for instance aluminum can be used for the disks.

Using such materials, it is possible to avoid any corrosion problem on the sheared surfaces of the shearing element. To obtain a clean fracture of the shearing pin, and to avoid pinching of the shearing pins, the pin can be formed of two different diameter sections, that is, as a stepped pin. With such a configuration of the pin, the breaking surface can be accurately defined.

Another advantageous embodiment of the invention includes the use of material contact as the predetermined breaking point member between the ring-shaped disks. The material contact or interconnection can be afforded by a spot weld deposit. Such a deposit can be carried out very accurately or the similar material contact can be afforded by pouring solder into holes or recesses provided in the disks.

Another characteristic of the invention is the provision of a stop means for limiting the extent of relative rotation between the disks. The range of possible rotation between the disks is selected, for example, in the range of 60° or 90° so that no error is possible. By proper shaping of the circumferential periphery of the disks, by providing segment-shaped sections or markings, the rotation of the disks can be clearly visible.

The stop means can be designed in a particularly advantageous manner by providing an arcuate groove in one of the ring disks with the groove being concentric with the center of the disk by providing a pin secured to the other disk so that it moves through the groove during relative rotation of the disks. Furthermore, the pin moving through the groove can be designed as a shear pin, that is, one that is sheared as it reaches the opposite end of the grooves at the higher tightening force so that this second higher force indicates the upper end of a tolerance range.

In providing desired friction characteristics, it is preferable to provide a corrugated surface on the disk juxtaposed to the surface of the base structure. In this manner the desired friction moment conditions can be better satisfied and the conditions are independent of the nature of the base structure, assuring that $M_3$ is greater than $M_1$, which is advisable in most cases.

In an especially advantageous embodiment of the invention, a conically shaped washer or ring-shaped disk is arranged between the fastening part and the adjacent ring-shaped disk, where the smaller of the friction moments between the fastening part and the conically shaped disk or between the conically shaped disk and the adjacent ring-shaped disk can be just higher than the friction moment $M_2$ but not equal to or less than $M_2$.

As has been pointed out, additional elements can be added to the ring-shaped disks of the safety disk assembly without impairing its function.

To better calculate or determine force at which the safety disk is released, it is only necessary that the defined additions prevail in the range of the lowest friction moment (and naturally between the disks). The conical disk has the advantage that the forces, which are rather strong, are better distributed and prevent the active friction radius (assumed in the foregoing as constant) from varying and thus destroying the defined conditions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
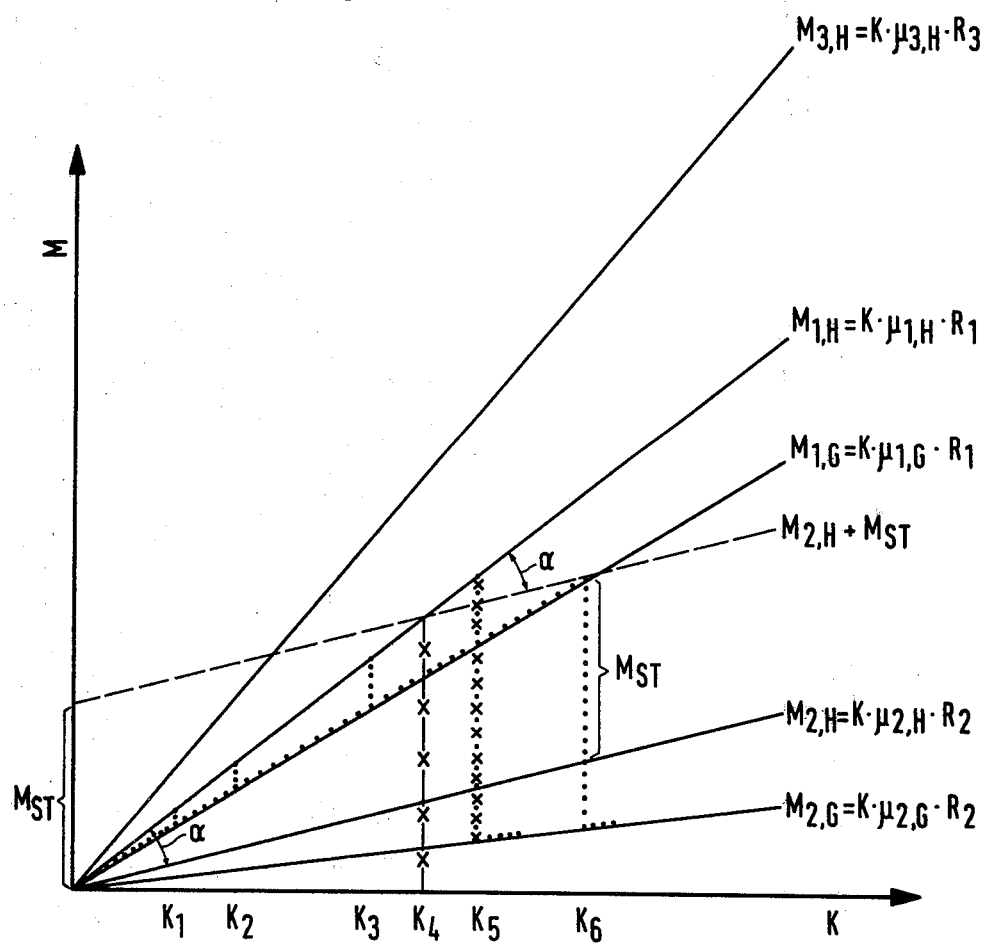
FIG. 1 is a schematic diagram of the various moments acting on the safety disk assembly which embodies the present invention.

FIG. 1 has already been discussed in detail.

Figure 2:
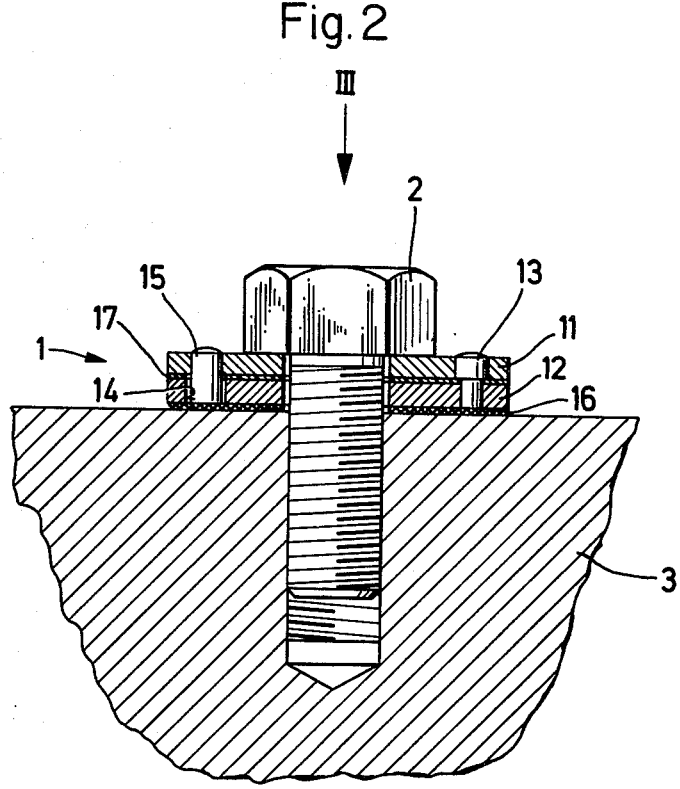
FIG. 2 is a side elevational view, partly in section, of a preferred embodiment of the safety disk assembly embodying the present invention, taken along the line II—II in FIG. 3.

In FIG. 2 a safety disc assembly 1 is shown in combination with a bolt 2 in threaded engagement within a hole in the base structure 3. The safety disk assembly 1 includes a first ring-shaped disk 11 adjacent the undersurface of the head of the bolt 2 and a second ring-shaped disk 12 positioned between the first disk and the surface of the base structure 3. Preferably, the ring-shaped disks are made of metal, for instance, galvanized steel, refined or superior quality steel or similar materials. The disks can, however, be also made of a suitable plastic material. The ring disks are interconnected by a shearing pin 13 disposed in form locking engagement with each of the disks. As can be noted in FIG. 2, the shearing pin 13 has two different diameter sections with the pin section in disk 11 being of a larger diameter than the section in disk 12. These two sections are arranged coaxially so that a fracture plane is provided at the junction of the two different diameter sections. This junction is located between the two disks so that an exact shearing fracture of the pin can be obtained without bending influences being formed. Shear pin 13 is formed, for example, of aluminum or a light metal alloy so that no corrosion problem will develop after the shearing action occurs.

On the opposite side of the second disk from the pin 13, there is provided an arcuate groove 14 concentric with the axis of rotation of the disks. A pin 15 is secured in the first disk 11 and extends downwardly into the groove 14, note FIG. 3. If the disks rotate relative to one another, pin 15 moves through the groove 14 from one end to the other, note FIGS. 3 and 4, with the opposite end of the groove forming a stop for the pin 15. If an even higher value of the tightening force is applied as the pin strikes the opposite end of the groove, it also can be sheared off. The pin 15 can be designed to shear under certain predetermined conditions.

The surface 16 of the second disk facing the surface of the base structure 3, is corrugated to afford a sufficiently high friction coefficient between the second disk and the base structure under any circumstance so that the second disk does not turn alone or with the first disk relative to the surface of the base structure. Between the facing surfaces of the ring-shaped disks 11, 12, a sliding layer 17 is positioned, that is, a ring-shaped disk layer of Teflon, for maintaining the friction between the disks at a low level, even though a strong force K is applied or the friction between the other elements is neglected.

Figure 3:
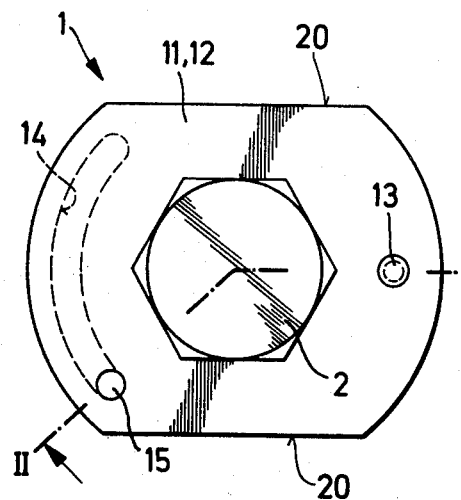
FIG. 3 is a top view taken in the direction of the arrow III in FIG. 2 showing the safety disk assembly before the relative rotation of its individual disks.

In FIG. 3 a preferred embodiment of the safety disk assembly is illustrated which is a top view of the arrangement displayed in FIG. 2. In FIG. 3 the safety disk assembly is in the first position before shearing occurs and there is any relative rotation between the ring-shaped disks 11, 12. Each of the disks 11, 12 have two opposed parallel straight edges 20 interconnected by circular edges. In the first position the edges are aligned one above the other and are formed by cutting off circular segments of the circular disks. The concentric groove 14 in the disk 12 extends over an angle of 90° and in the represented first position the moving pin is arranged at the first end of the groove. After shear pin 13 is sheared off, and the disks rotate, the pin 15 moves through the groove 14 to the second end as the ring-shaped disk 11 rotates through 90° relative to the ring-shaped disk 12.

Figure 4:
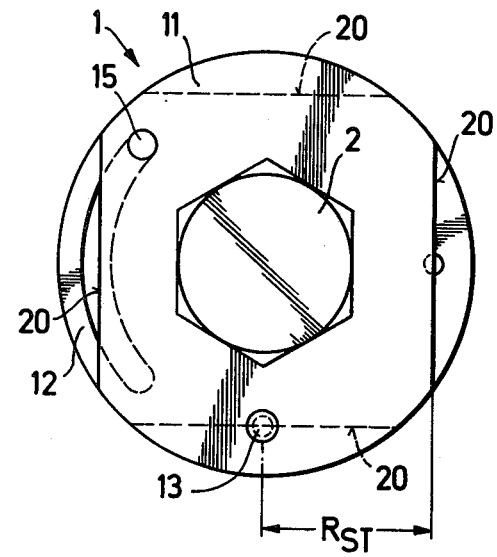
FIG. 4 is a view similar to FIG. 3, however, showing the disks after relative rotation between them.

In FIG. 4 another top view of the safety disk assembly 1 is displayed, however, in this view the shear pin 13 has been sheared off and rotated through 90°. The straight edges 20 on the disks 11, 12 are no longer aligned one with the other and as is clearly shown in FIG. 4, the fact that the pin 13 has sheared off and rotation has taken place can be clearly visibly observed. Further, pin 15 can be designed as a shear pin to be sheared off when the tightening force K is increased beyond a second limiting value during the further tightening of the fastening part 2 toward the base structure 3, so that a safety margin for the force K and for exceeding this safety margin, respectively, can be indicated. FIG. 4 also illustrates the radius $R_{ST}$ entering into the maximum moment with which the shear pin 13 resists rotation of the disks.

Figure 6:
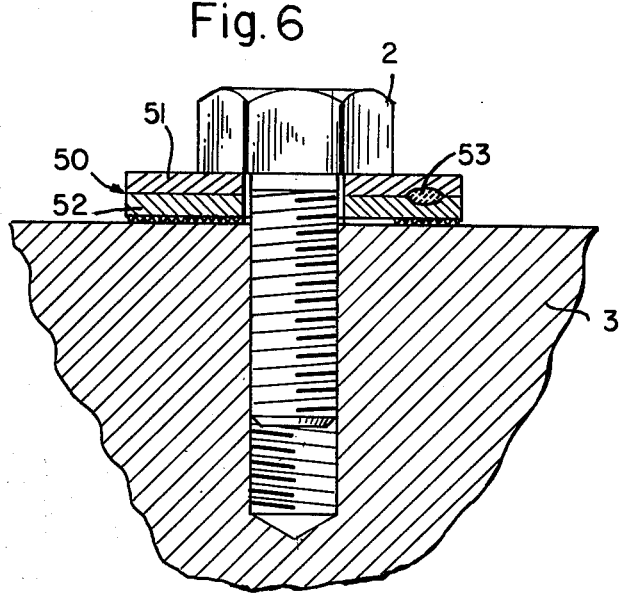
FIG. 6 is a wide elevational view, partly in section, of still another embodiment of the present invention.
Figure 5:
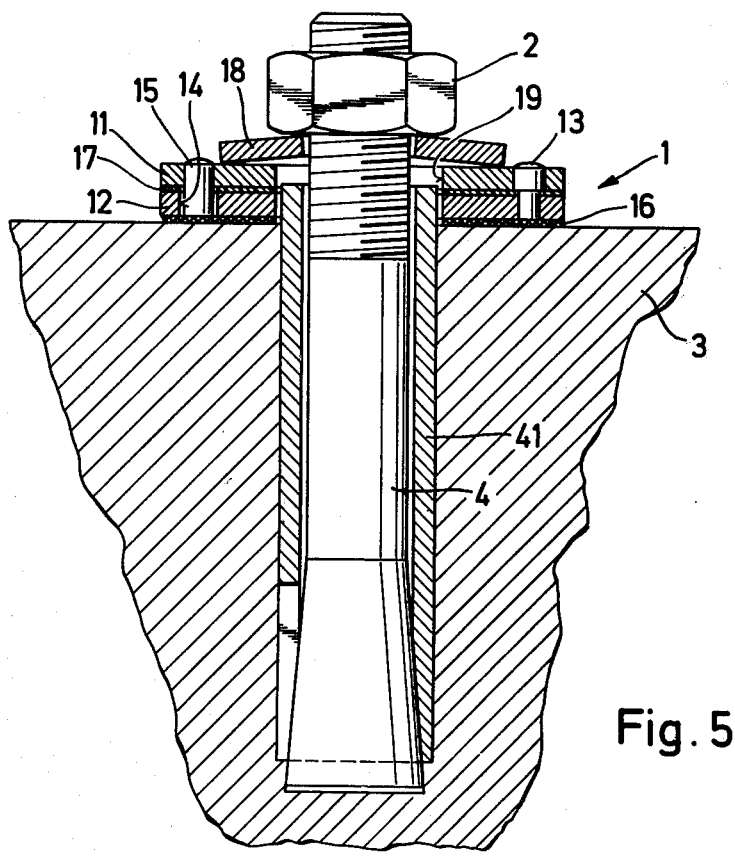
FIG. 5 is a side elevational view, partly in section, of another embodiment of the present invention including an expansion dowel.

In FIG. 5, the safety disk assembly 1 is shown in combination with an expansion dowel 4 inserted into a bore hole in the base structure 3. Because of the great forces developed in securing the expansion dowel in the base structure, a conically shaped washer 18 is arranged between the fastening part 2, in this case a nut, and the juxtaposed surface of the adjacent disk 11 for improving the distribution of the forces. Within the hole in the support structure, an expansion sleeve 41 encircles the expansion dowel 4 and the dowel must be so firmly anchored in the base structure that the sleeve 41 does not press with any force against the conically shaped washer or disk 18, otherwise the indications provided by the safety disk assembly would be falsified. To assure that the expansion sleeve 41 does not strike against the safety disk assembly 1, a ring hole 19 is provided through the safety disk assembly which has a larger diameter than the outside diameter of the sleeve. The remaining parts of the safety disk assembly 1 in FIG. 5 are the same as those shown in FIGS. 2–4, accordingly, further description is not necessary. In FIG. 6, a safety disk assembly 50 consists of a first ring-shaped disk 51 connected to a second ring-shaped disk 52 by a spot weld deposit 53. The weld deposit 53 interconnects the disks.

While specific embodiments of the invention have been shown and described in detail to illustrate the application of the invention principles, it will be understood that the invention may be embodied otherwise without departing from such principles.

What is claimed is:

1. A safety disk assembly including a fastening member to be secured into a base structure with the fastening member, such as a bolt, stud, dowel or the like, and a safety disk member, said fastening member comprising an axially elongated shank arranged to extend into the base structure with an axially extending part thereof projecting outwardly from the base structure, and a fastening part located on the part of said shank projecting outwardly from the base structure, said fastening part extending transversely outwardly from the outer surface of said shank, said safety disk member being arranged between the fastening part and the base structure and laterally encircling said shank so that the safety disk member is passed between the fastening part and the base structure as the fastening part is tightened toward the base structure, said safety disk member comprises a first washer-like ring disk having an opening therethrough, a second washer-like ring disk having an opening therethrough, the openings of said first and second disks being aligned, the surfaces defining the openings in said first and second ring disks encircling and spaced radially outwardly from the outer surface of said shank so that rotation or axial movement of said shank occurs without surface contact with said first and second ring disks, said first and second disks each having a first face surface and a second face surface with the face surfaces extending transversely of the axial direction of the openings through said disks, the second surface of said first disk disposed in contact with the first surface of said second disk, means for interconnecting said first and second disks having a predetermined breaking point for preventing relative rotation between said first and second disks until the predetermined breaking point has been exceeded in tightening the fastening part toward the base structurre, the first surface of said first disk arranged to face toward the fastening part and the second surface of said second disk arranged to face toward the base structure, the friction coefficients and effective radii of the first surface of said first disk and the second surface of said second disk being selected so that when a tightening force in the form of a torque is applied to the fastening part and directed through said safety disk member for tightening the fastening part toward the base structure and the predetermined breaking point of said means is overcome breaking the interconnection between said first and second disks whereby said disks are released for relative rotation with respect to one another, and means for indicating when the relative rotation of said first and second disks have been effected.

2. A safety disk assembly, as set forth in claim 1, wherein means for providing that the friction moment between said first and second disks is smaller than the friction moment between the first surface of said first disk and the fastening part and between the second surface of said second disk and the base structure so that when the fastening part is tightened toward the base structure at the predetermined tightening force, the differential friction moment of the smaller of the friction moments between the first surface of said first disk and the fastening part and between the second surface of said second disk and the base structure and the friction moment between said first and second disks is sufficient for breaking said means for interconnecting said first and second disks.

3. A safety disk assembly, as set forth in claim 1, wherein said means for interconnecting said first and second disks comprises a member in form locking engagement with and extending between said first and second disks.

4. A safety disk assembly, as set forth in claim 3, wherein said means for interconnecting said first and second disks comprises a shear element.

5. A safety disk assembly, as set forth in claim 1, wherein said shear element comprises an axially extending shear pin with the axis thereof disposed in parallel relation with the axis of said shank.

6. A safety disk assembly, as set forth in claim 5, wherein said shear pin having a first axially extending section and a second axially extending section coaxial with said first section and having a smaller diameter than said first section and the end of said first section connected to said second section forming an annular shaped sharp-edged shoulder.

7. A safety disk assembly, as set forth in claim 6, wherein said annular shoulder being located in the plane of the second surface of said first disk and the first surface of said second disk for forming the fracture plane of sheer pin.

8. A safety disk assembly, as set forth in claim 3, wherein said means for interconnecting said first and second disks comprises a member integrally connecting said first and second disks.

9. A safety disk assembly, as set forth in claim 8, wherein said integral connecting member comprises a spot weld deposit.

10. A safety disk assembly, as set forth in claim 6, wherein said means for interconnecting said first and second disks including stop means for permitting limited relative rotation between said first and second disks.

11. A safety disk assembly as set forth in claim 1, wherein the second surface of said second disk being corrugated.

12. A safety disk assembly, as set forth in claim 1, wherein a conically shaped ring disk arranged to be disposed between the fastening part and the first surface of said first disk, so that during tightening of the fastening part toward the base structure, said conically shaped ring disk bears against the first surface of said first disk and the friction moment therebetween can be at least greater than the friction moment between said first and second disks.

13. A safety disk assembly, as set forth in claim 1, wherein said means for indicating when a relative rotation of said first and second disks has been effected comprises straight edge portions being formed on the circumferential periphery of said first and second disks and curved edge portions interconnecting said straight edge portions so that relative rotation between said disks can be visibly observed by the displacement of said straight edge portions relative to one another.

14. A safety disk assembly for use with a fastening member to be secured into a base structure with the fastening member, such as bolt, stud, dowel or the like, having a transversely extending fastening part with said safety disk assembly being arranged between the fastening part and the base structure so that the safety disk is pressed between the fastening part and the base structure as the fastening part is tightened toward the base structure, wherein said safety disk assembly comprises a first ring disk having an opening therethrough, a second ring disk having an opening therethrough, the openings of said first and second disks being aligned, said first and second disks each having a first face surface and a second face surface with the face surfaces extending transversely of the axial direction of the openings through said disks, the second surface of said first disk disposed in contact with the first surface of said second disk, means for interconnecting said first and second disks having a predetermined breaking point for preventing relative rotation between said first and second disks until the predetermined breaking point has been exceeded in tightening the fastening part toward the base structure, the first surface of said first dish arranged to face toward the fastening part and the second surface of said second disk arranged to face toward the base structure, the friction coefficients and effective radii of the first surface of said first disk and the second surface of said second disk being selected so that when a tightening force in the form of a torque is applied to the fastening part and directed through said safety disk assembly for tightening the fastening part toward the base structure and the predetermined breaking point of said means is overcome, said first and second disks are released for relative rotation with respect to one another, means for indicating when the relative rotation of said first and second disks has been effected, means for providing that the friction moment between said first and second disks is smaller than the friction moment between the first surface of said first disk and the fastening part and between the second surface of said second disk and the base structure so that when the fastening part is tightened toward the base structure of the predetermined tightening force, the differential friction moment of the smaller of the friction moments between the first surface of said first disk and the fastening part and between the second surface of said second disk and the base structure and the friction moment between said first and second disks is sufficient for breaking said means for interconnecting said first and second disks, and said means for providing the friction moment between said first and second disks comprises a thin layer of low friction coefficient material.

15. A safety disk assembly, as set forth in claim 14, wherein said thin layer having a low friction coefficient being formed of Teflon.

16. A safety disk assembly for use with a fastening member secured into a base structure with the fastening member, such as a bolt, stud, dowel or the like, having a transversely extending fastening part, said safety disk assembly being arranged between the fastening part and the base structure so that the safety disk is pressed between the fastening part and the base structure as the fastening part is tightened toward the base structure, wherein said safety disk assembly comprises a first ring disk having an opening therethrough, a second ring disk having an opening therethrough, the openings of said first and second disks being aligned, said first and second disks each having a first face surface and a second face surface with the face surface extending transversely of the axial direction of the openings through said disks, the second surface of said first disk disposed in contact with the first surface of said second disk, means for interconnecting said first and second disks having a predetermined breaking point for preventing relative rotation between said first and second disks until the predetermined breaking point has been exceeded in tightening the fastening part toward the base structure, the first surface of said first disk arranged to face toward the fastening part and the second surface of said second disk arranged to face toward the base structure, the friction coefficient and effective radii of the first surface of said first disk and the second surface of said second disk being selected so that when a tightening force in the form of a torque is applied to the fastening part and directed through said safety disk assembly for tightening the fastening part toward the base structure and the predetermined breaking point of said means is overcome, said first and second disks are released for relative rotation with respect one another, means for indicating when the relative rotation of said first and second disks has been effected, said means for interconnecting said first and second disks comprises a member in form locking engagement with and extending between said first and second disks, said means for interconnecting said first and second disks comprises a shear element, said means for interconnecting said first and second disks includes stop means for permitting limited relative rotation between said first and second disks, and said stop means comprises an arcuate groove in one of said disks concentric with the axis of rotation thereof, and a pin secured to the other one of said disks and extending into said groove.

17. A safety disk assembly as set forth in claim 16, wherein stop means including a second shear element having a second predetermined breaking point greater than the predetermined breaking point of the shear element interconnecting said first and second disks, said second shear element comprising said pin located in said groove.

18. An expansion dowel comprising an expansion sleeve for insertion into a prepared bore hole, an axially extending rod shaped expanding member positioned within and displaceable through said sleeve, an enlarged head on one end of said expanding member and arranged to be pulled through the sleeve outwardly for expanding the sleeve radially outward, the opposite end of said expanding member from said head being threaded, a nut disposed in threaded engagement with the threaded end of said expanding member and a safety disk member positioned between said nut and the opposite end of said expanding member and arranged to be tightened against the surface of a base structure as said dowel is expanded within the base structure, wherein said safety disk member comprises a first ring disk having an opening therethrough, a second ring disk having an opening therethrough, the opening of said first and second disks being aligned and the surface of said disks forming the openings therethrough being spaced radially outwardly from said expanding member and sleeve so that there is no contact between said disks and said expanding member and sleeve, said first and second disks each having a first surface and a second face surface with the face surfaces extending transversely of the axial direction of the opening through said disks, the second surface of said first disk disposed in contact with the first surface of said second disk, means for interconnecting said first and second disks having a predetermined breaking point for preventing relative rotation between said first and second disks until the predetermined breaking point has been exceeded in tightening the nut on said dowel toward the base structure, the first surface of said first ring arranged to face toward said nut and the second surface of said second disk arranged to face toward the base structure, the friction coefficients and effective radii of the first surface of said first disk and the second surface of said second disk being selected so that when a tightening force in the form of a torque is applied to said nut and directed through said safety disk assembly for tightening the nut toward the base structure and the predetermined breaking point of said means is overcome said first and second disks are released for rotation relative to one another, and means for indicating when the relative rotation of said first and second disks has been effected.

* * * * *